(12) United States Patent
Wang et al.

(10) Patent No.: US 10,257,108 B2
(45) Date of Patent: Apr. 9, 2019

(54) SCHEDULER TO IMPROVE FAIRNESS AND THROUGHPUT FOR FULL-DUPLEX WIFI COMMUNICATIONS

(71) Applicant: Intel Corporation, Santa Clara, CA (US)

(72) Inventors: Yicong Wang, Austin, TX (US); Shu-Ping Yeh, Campbell, CA (US); Ping Wang, San Jose, CA (US); Alexander W. Min, Portland, OR (US); Yang-Seok Choi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 3 days.

(21) Appl. No.: 15/471,410

(22) Filed: Mar. 28, 2017

(65) Prior Publication Data

US 2018/0288789 A1 Oct. 4, 2018

(51) Int. Cl.
| | |
|---|---|
| *H04W 72/12* | (2009.01) |
| *H04L 5/14* | (2006.01) |
| *H04L 12/863* | (2013.01) |
| *H04W 88/08* | (2009.01) |
| *H04W 74/08* | (2009.01) |
| *H04W 84/12* | (2009.01) |

(52) U.S. Cl.
CPC .......... *H04L 47/6225* (2013.01); *H04L 5/14* (2013.01); *H04W 72/1247* (2013.01); *H04W 74/0808* (2013.01); *H04W 84/12* (2013.01); *H04W 88/08* (2013.01)

(58) Field of Classification Search
CPC ...... H04L 5/14; H04L 47/6225; H04W 88/08; H04W 72/1247; H04W 74/0808; H04W 84/12

USPC .......................................................... 370/277
See application file for complete search history.

(56) References Cited

U.S. PATENT DOCUMENTS

| | | | |
|---|---|---|---|
| 9,935,785 B2 * | 4/2018 | Aggarwal | ......... H04L 12/40013 |
| 2012/0076057 A1 | 3/2012 | Pannell et al. | |
| 2015/0016309 A1* | 1/2015 | Fang | .................. H04L 5/14 370/277 |
| 2015/0229461 A1 | 8/2015 | Difazio et al. | |
| 2016/0344532 A1 | 11/2016 | Bhat et al. | |
| 2017/0150492 A1* | 5/2017 | Ozaki | ............ H04W 72/048 |

(Continued)

OTHER PUBLICATIONS

Kim, Jae Young, et al., "Janus: A Novel MAC Protocol for Full Duplex Radio", Stanford University, (2013), 12 pgs.

(Continued)

*Primary Examiner* — Faisal Choudhury
(74) *Attorney, Agent, or Firm* — Schwegman Lundberg & Woessner, P.A.

(57) ABSTRACT

A full-duplex (FD) capable access point (AP) of a wireless basic service set (BSS) that includes a plurality of stations (STAs) is configured to implement opportunistic FD downlink (DL) transmissions to a non-FD capable STA in the BSS when decoding uplink (UL) data from a UL STA in the BSS. While decoding the UL data, the AP selects a DL STA from a queue of DL STAs based on a predetermined FD DL transmission rate from the AP to the DL STA while the AP is decoding the UL data from the UL STA. The AP then causes an amount of data to be transmitted as an FD transmission to the selected DL STA while the processor is decoding the data from the UL STA.

22 Claims, 9 Drawing Sheets

(56) References Cited

U.S. PATENT DOCUMENTS

2017/0150526 A1\* 5/2017 Huang .............. H04W 74/0816
2018/0084548 A1\* 3/2018 Min ................. H04W 72/0453

OTHER PUBLICATIONS

Singh, Nikhil, et al., "Efficient and Fair MAC for Wireless Networks with Self-interference Cancellation", Microsoft Research, UK University of Illinois at Urbana Champaign University of Southern California, 8 pgs.

Tang, Aimin, et al., "A-Duplex: Medium Access Control for Efficient Coexistence Between Full-Duplex and Half-Duplex Communications", IEEE Transactions on Wireless Communications, vol. 14, No. 10,, (Oct. 2015), 15 pgs.

"International Application Serial No. PCT/US2018/024570, International Search Report dated Jul. 4, 2018", 3 pgs.

"International Application Serial No. PCT/US2018/024570, Written Opion dated Jul. 4, 2018", 5 pgs.

Andre, Bourdoux, et al., "Full-duplex Technology for HEW", IMEC, IEEE 11-13/0764r1, (Jul. 17, 2013).

Huawei, et al., "Evaluation of duplexing flexibility in indoor hotspot scenario", R1-1701672, 3GPP TSG RAN WG1 Meeting #88, Athens, Greece,, (Feb. 7, 2017).

\* cited by examiner

SCHEDULER TO IMPROVE FAIRNESS AND THROUGHPUT FOR FULL-DUPLEX WIFI COMMUNICATIONS

CROSS REFERENCE TO RELATED APPLICATIONS

Technical Field

This application relates to schedulers for full-duplex (FD) capable Wi-Fi access points (APs) and in particular to a scheduler that improves performance in Wi-Fi basic service sets (BSS) that include non-full-duplex stations (STAs).

BACKGROUND

Full-duplex (FD) techniques enable simultaneous transmission and reception of data packets within a basic service set (BSS) which potentially provides two times better spectral efficiency than existing half-duplex systems. Recent advances in interference cancellation techniques have achieved more than 120 dB self-interference cancellation, which is enough to suppress interference at a transmitting device to be equivalent to low-level noise, enabling the transmitting device to simultaneously receive signals from other devices in the BSS. The implementation and rollout of FD may improve system throughput for the next generation, 5G, cellular, Wi-Fi systems, Bluetooth, ZigBee and other wireless protocols.

DESCRIPTION OF EMBODIMENTS

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. Although the examples below concern IEEE 802.11 Wi-Fi systems, it is contemplated that these principles may be applied to other wireless technologies such as 5G cellular, Bluetooth and IEEE 802.15 ZigBee.

Figure 1:
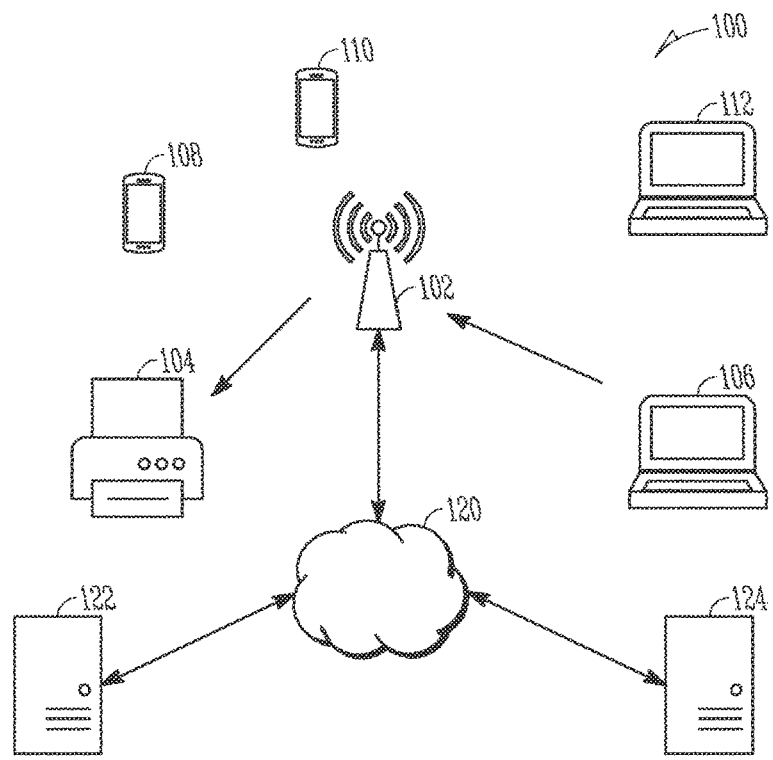
FIG. 1 is a block diagram of an example basic service set including a full-duplex capable access point.

The proposed implementations of FD Wi-Fi use newly designed media access control (MAC) hardware that implements the self-cancellation processing. Because legacy Wi-Fi systems cannot be converted to FD without hardware changes it is likely that FD and HD Wi-Fi will coexist for some time. Even though full FD) Wi-Fi transmissions may not be immediately available, as described below, a FD AP may use asymmetric FD transmissions to improve system throughput even when all of the STAs in the BSS are HD STAs. An asymmetric opportunistic FD transmission simultaneously transmits downlink (DL) data to, and receives uplink (UL) data from different STAs in the BSS. An example of such a system is shown in FIG. 1, which illustrates a BSS having an AP 102 and five STAs 104, 106, 108, 110 and 112. The AP 102 also has a connection to a network 120, which may be a local area network (LAN) or wide area network (WAN) including a global information network (e.g. the Internet). FIG. 1 shows an example asymmetric FD UL DL transmission in which a UL STA 106 sends data to AP 102 while the AP 102 sends data to a DL STA 104.

Figure 2:
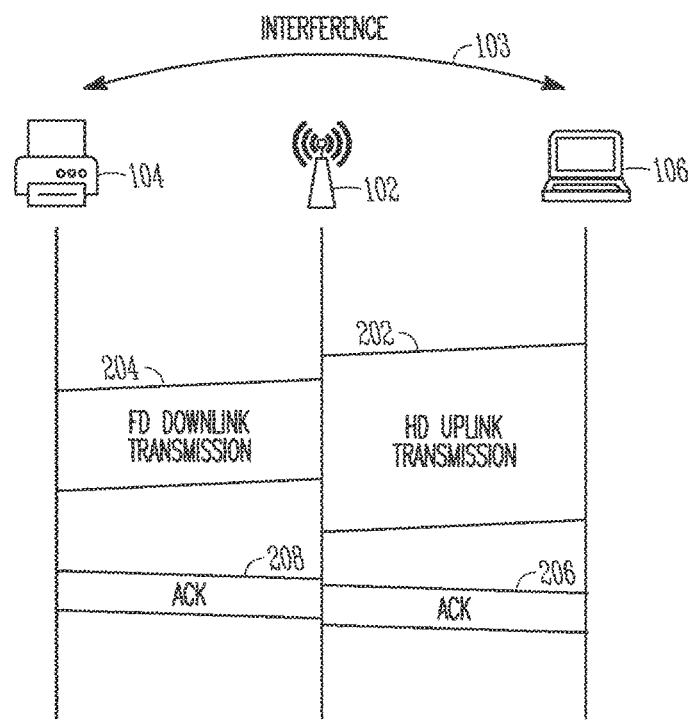
FIG. 2 is timing diagram showing an opportunistic full-duplex transmission.

There are several challenges in the implementation of asymmetric FD including the management of station to station (STA-STA) interference and providing fair channel access among the FD-participating STAs FIG. 2 shows an example sequence for an opportunistic FD DL-UL transmission. In this example the STA 106 begins an HD UL transmission 202. The AP 102 receives the transmission and selects STA 104 to receive an FD DL transmission 204. The STA-STA interference is illustrated by the arrow 103. The FD DL transmission occurs only during the HD UL transmission. At the end of the HD UL transmission, the STA 106 sends an acknowledgment message (ACK) to the STA 102 and at the end of the FD DL transmission 204, the STA 104 also sends an ACK to the AP 102.

In such an FD UL-DL transmission scenario, the interference 103 from the UL transmission 202 may greatly affect reception of the DL transmission at the DL STA 104, degrading DL performance and limiting potential throughput gained from the use of FD. Depending on the proximity of the STAs 102 and 104 in the BSS 100, the achievable FD DL rate may vary widely for different UL-DL STA pairings. If equal transmission opportunities are allocated to STAs with poor FD DL rate and STAs with good I-ID DL rate, the overall FD gain may be suboptimal since the additional spectrum resource for FD is not efficiently used. As described below, however, these difficulties may be overcome by taking STA-STA interference into account when scheduling FD DL transmissions.

Another challenge in enabling FD Wi-Fi is to provide fair channel access among FD STAs. Legacy HD Wi-Fi systems use contention-based medium access control (MAC) (e g. Carrier Sense Multiple Access/Collision Avoidance (CSMA/CA)) to improve fairness in the allocation of channels among STAs and AP. In these systems the AP uses a round-robin scheduler to provide fair HD DL, rates to the STAs in the BSS. In some FD Wi-Fi systems, however, due to STA-STA interference, only a small set of DL STAs can be paired to receive transmissions from an AP when the AP is receiving a UL transmission from a given UL STA. The DL STAs in the set having lower STA-STA interference may have more FD DL transmission opportunity than other DL STAs as the STAs having less interference may be scheduled to receive DL transmissions more frequently. Thus, using an HD scheduler for FD transmissions may result in a high level of unfairness among the STAs.

Due even relatively low levels of STA-STA interference, a lower-data rate modulation coding scheme (MCS) may be used to increase the likelihood that that the FD DL transmission will be successful. Thus, the FD DL data rate tends to be lower than HD DL rate. Consequently, a scheduler allocating all STAs equal transmission opportunity for both FD and HD transmissions may result in lower data rates than if only HD DL transmissions were scheduled. To avoid unfair data rates among the STAs, an FD transmission opportunity should be weighted differently from an HD transmission opportunity. Therefore joint scheduling of HD and FD transmissions is desirable to achieve higher FD gain and better fairness among the STAs in a BSS.

The examples below describe new schedulers for FD Wi-Fi systems that improve throughput gain and fairness. Example schedulers schedule UL DL STA pairs for FD scheduling based on UL and DL channel quality information and STA-STA interference to enable efficient FD DL transmissions. STAs having better FD DL rate are opportunistically scheduled for FD transmission in order to improve overall throughput. Various schedulers for FD transmissions described below include Max-N-rate, Max-N-rate-ratio and Min-rate-threshold. Also as described below, higher throughput can be achieved by the example schedulers compared to a baseline round-robin scheduler. The examples below further describe a fair scheduling algorithm, fair-rate joint FD+HD scheduling, which takes into account both HD and FD transmissions and which prioritizes STAs based on their HD and FD rates. The simulation results presented below with reference to FIGS. 7A-7F demonstrate that the proposed fair-rate joint FD+HD scheduler achieves higher FD throughput gain and provides good fairness among STAs.

Figure 3A:
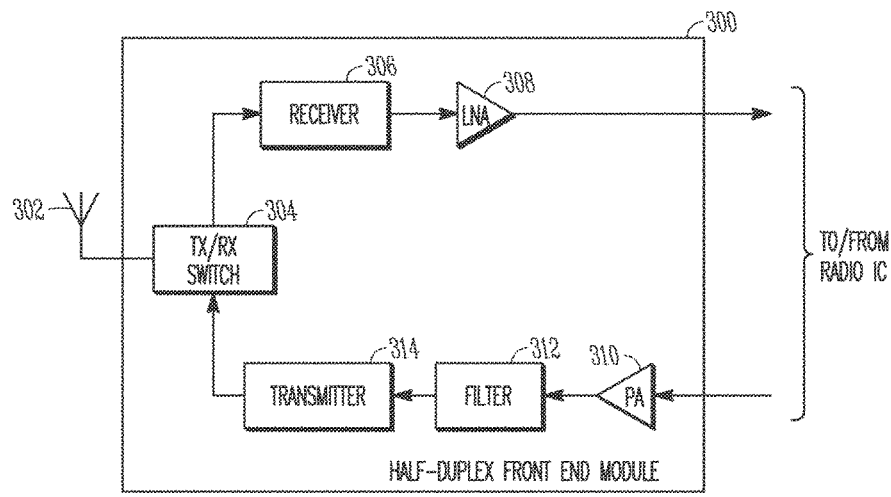
FIGS. 3A and 3B are block diagrams of front-end modules of example non-full-duplex capable and full-duplex capable radio architectures, respectively.
Figure 3B:
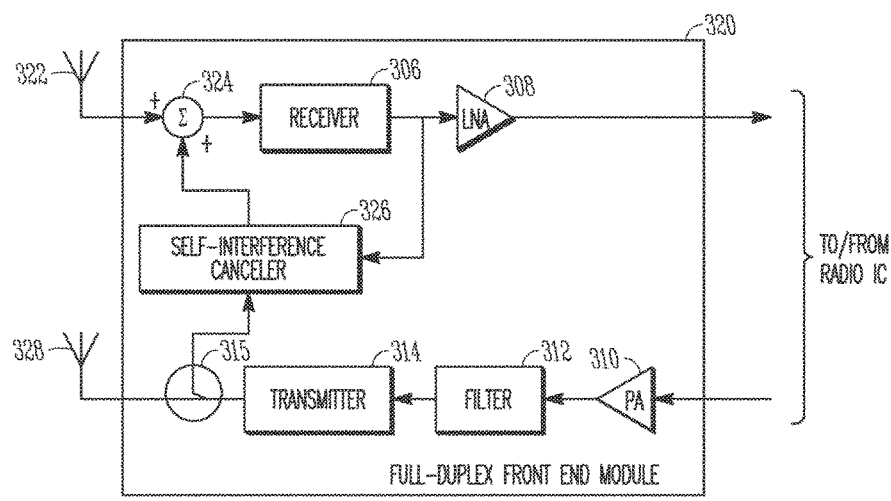

FIGS. 3A. 3B and 4 describe an example radio architecture. FIG. 3A is a block diagram of example HD radio front-end module (FEM) circuitry 300 and FIG. 3B is a block diagram of example FD FEM circuitry 320. The example radio architecture also includes radio IC circuitry and baseband processing circuitry 400 which are described below with reference to FIG. 4.

Figure 4:
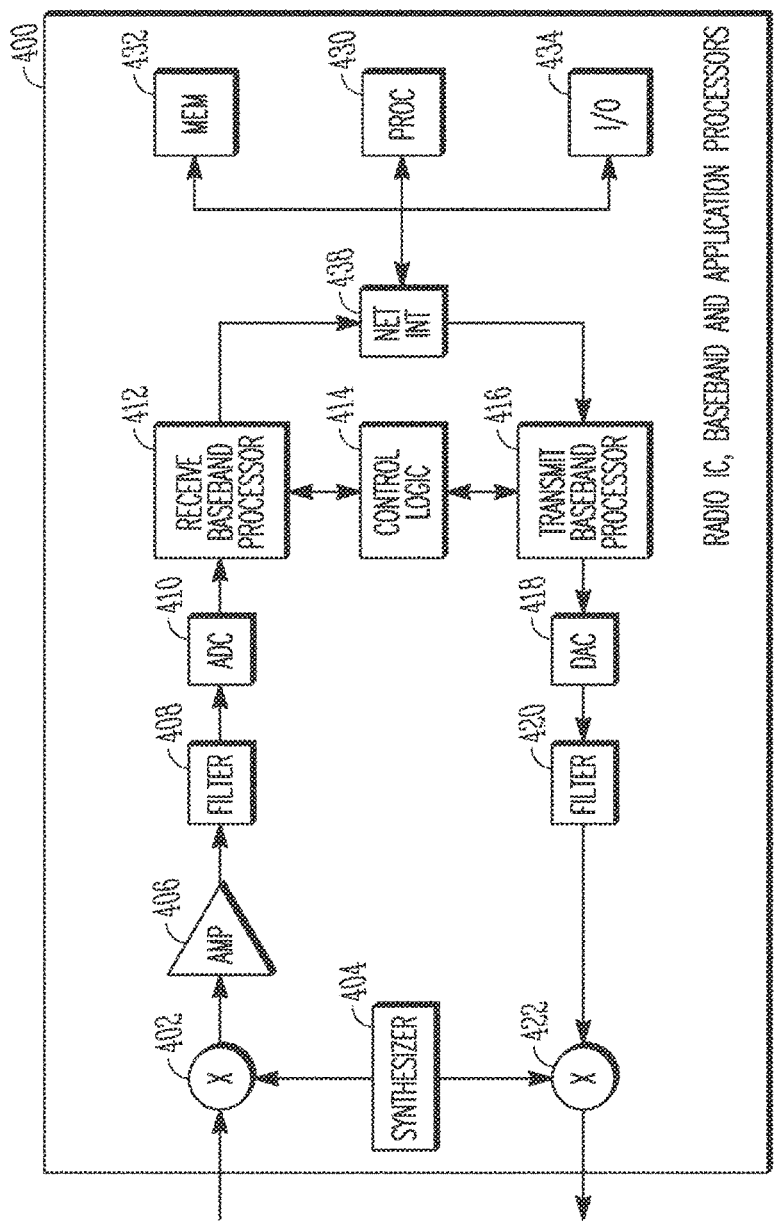
FIG. 4 is a block diagram of example baseband and application processors of an example radio architecture.

FEM circuitry 300 and 320, shown in FIGS. 3A and 3B, respectively, may include a receive signal path comprising circuitry configured to operate on WLAN (e.g. Wi-Fi) RF signals received from one or more antennas 302, 322 and/or 328, to amplify the received signals and to provide the amplified versions of the received signals to the WLAN radio IC circuitry 400, shown in FIG. 4, for further processing. FEM circuitry 300 and 320 may also include a transmit signal path that includes circuitry configured to amplify WLAN signals provided by the radio IC circuitry shown in FIG. 4 for wireless transmission by one or more of the antennas 302, 322 and/or 328.

In some embodiments, the radio architecture shown in FIGS. 3A, 3B and 4 may be part of a Wi-Fi communication station (STA) such as a wireless access point (AP), a base station or a mobile device including a Wi-Fi device. In some of these embodiments, the radio architecture may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11 ac, and/or 802.11ax standards and/or proposed specifications for WLANs, although the scope of embodiments is not limited in this respect. The radio architecture may also be suitable to transmit and/or receive communications in accordance with other techniques and standards.

In some embodiments, the radio architecture may be configured for high-efficiency (HE) Wi-Fi (HEW) communications in accordance with the IEEE 802.1 lax standard. In these embodiments, the radio architecture may be configured to communicate in accordance with an OFDMA technique, although the scope of the embodiments is not limited in this respect.

In some other embodiments, the radio architecture may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, SM-Hz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

FIGS. 3A and 3B illustrate respective HD FEM circuitry 300 and FD FEM circuitry 320 in accordance with some embodiments. The FEM circuitry 300 and/or 320 are examples of circuitry that may be suitable for use as the WLAN, although other circuitry configurations may also be suitable.

In some embodiments, the HD FEM circuitry 300 may include a TX/RX switch 304 to switch between transmit mode and receive mode operation. The HD FEM circuitry 300 may include a receive signal path and a transmit signal path. The receive signal path of the FEM circuitry 300 may include a low-noise amplifier (LNA) 308 to amplify RF signals received via receiver 306 and provide the amplified received RF signals as an output (e.g., to the radio IC and baseband circuitry 400 (FIG. 4)). The transmit signal path of the circuitry 300 may include a power amplifier (PA) 310 to amplify input RF signals (e.g., provided by the radio IC and baseband circuitry 400), and one or more filters 312, such as band-pass filters (BPFs), low-pass filters (LPFs) or other types of tilters, to generate RF signals for subsequent transmission by the transmitter 314 and one or more of the antennas 302 via the TX/RX switch 304.

In some embodiments, the FD FEM circuitry 320 may include all of the elements of the HD FEM circuitry except for the TX/RX switch 304. In addition, the example FDM circuitry includes a self-interference canceller 326, a tap 315 and a summing circuit 324. The circuit elements 306, 308, 310, 312 and 314 operate in the same way as disclosed above with reference to FIG. 3A and are not further described herein. The self-interference canceler 326 receives a portion of the signal provided by the transmitter 314 to the transmit antenna 328 via the tap (e.g. a balun) 315. The self-interference canceler inverts and phase shifts the signal provided by the tap 315 to generate a signal which is applied to the summing circuit 324. Summing circuit 324 adds the inverted and phase shifted signal to the input RF signal provided by receive antenna 322. Self-interference canceler 326 is also coupled to the output of receiver 306 to adjust the amplitude and phase of the signal applied to summing circuit 324 to substantially cancel any component of the signal received by antenna 322 which corresponds to the transmitted signal provided by antenna 328.

In some dual-mode embodiments for Wi-Fi communication, the FEM circuitry 300 and/or 320 may be configured to operate in either the 2.4 GHz frequency spectrum or the 5 GHz frequency spectrum. In these embodiments, the receive signal path of the FEM circuitry 300 may include a receive signal path duplexer (not shown) to separate the signals from each spectrum as well as provide a separate LNA, such as the LNA 308, not shown for each spectrum. In these embodiments, the transmit signal path of the FEM circuitry 300 and/or 320 may also include a power amplifier such as the amplifier 310 and a filter such as the filter 312 for each frequency spectrum and a transmit signal path duplexer (not shown) to provide the signals of one of the different spectrums onto a single transmit path for subsequent transmission by the one or more of the antennas 328.

FIG. 4 illustrates an example radio IC circuitry and baseband circuitry 400. In some embodiments, the radio IC circuitry and baseband circuitry 400 may include a receive signal path and a transmit signal path. The receive signal path of the radio IC circuitry 400 may include at least mixer circuitry 402, such as, for example, down-conversion mixer circuitry, amplifier circuitry 406 and filter circuitry 408. The transmit signal path of the radio IC circuitry 400 may include at least filter circuitry 420 and mixer circuitry 422, such as, for example, up-conversion mixer circuitry. The circuitry 400 may also include synthesizer circuitry 404 for synthesizing a frequency for use by the mixer circuitry 402 and the mixer circuitry 422. The mixer circuitry 402 and/or 422 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation FIG. 4 illustrates only a simplified version of a radio IC circuitry, and may include, although not shown, embodiments where each of the depicted circuitries may include more than one component. For instance, mixer circuitry 402 and/or 422 may each include one or more mixers, and filter circuitries 408 and/or 420 may each include one or more filters, such as one or more BPFs and/or LPFs according to application needs. For example, when mixer circuitries are of the direct-conversion type, they may each include two or more mixers. It is also contemplated that the mixer circuitry 402 may include a low-IF (LIF) mixer or a very low-IF (VLIF) mixer.

In some embodiments, mixer circuitry 402 may be configured to down-convert RF signals received from the HD FEM circuitry 300 (FIG. 3A) or the FD FEM circuitry 320 (FIG. 3B) based on a synthesized frequency provided by synthesizer circuitry 404. The amplifier circuitry 406 may be configured to amplify the down-converted signals and the filter circuitry 408 may include a LPF configured to remove unwanted signals from the down-converted signals to generate output baseband signals. Output baseband signals are digitized by an analog-to digital converter (ADC) 410 and provided to the receive baseband processing circuitry 412 for further processing. In an AP, the example receive baseband processing circuitry decodes UL data and sends it to the application processor 430 via the network interface 438. In some embodiments, the output baseband signals may be zero-frequency baseband signals, LIF signals or VLIF signals, although this is not a requirement. In some embodiments, mixer circuitry 402 may comprise passive mixers, although the scope of the embodiments is not limited in this respect.

In some embodiments, the mixer circuitry 422 may be configured to up-convert input baseband signals provided by the filter 420 based on the synthesized frequency provided by the synthesizer circuitry 404 to generate RF output signals for the HD FEM circuitry 300 (FIG. 3A) or the FD FEM circuitry 320 (FIG. 3B). The baseband signals may be provided by transmit baseband processing circuitry 416, which, in an AP, encodes the DL data for transmission, and may be converted to analog signals by a digital-to-analog converter (DAC) 418. The analog signals may be filtered by filter circuitry 420 which may include a LPF or a BPF, although the scope of the embodiments is not limited in this respect.

The example receive baseband processor 412 and transmit baseband processor 416 are controlled by control logic 414. Output signals provided by the receive baseband processor 412 are applied to a network interface 438, which also provides signals to the transmit baseband processor 416. The network interface 438, in turn, is coupled to an application processor 430 via a bus 436. In this example, the application processor 430 is also coupled to a memory 432 and input/output (I/O) circuitry 434 by the bus 436. The scheduling mechanism described below with reference to FIGS. 5, 6A, 6B and 6C may be implemented on one or more of the receive baseband processor 412, the transmit baseband processor 416, the control logic 414 and/or the application processor 430.

In some embodiments, the mixer circuitry 402 and the mixer circuitry 422 may each include two or more mixers and may be arranged for quadrature down-conversion and/or up-conversion respectively with the help of synthesizer 404. In some embodiments, the mixer circuitry 402 and the mixer circuitry 422 may each include two or more mixers each configured for image rejection (e.g., Hartley image rejection). In some embodiments, the mixer circuitry 402 and the mixer circuitry 422 may be arranged for direct down-conversion and/or direct up-conversion, respectively. In some embodiments, the mixer circuitry 402 and the mixer circuitry 422 may be configured for super-heterodyne operation, although this is not a requirement.

Mixer circuitry 402 may comprise, according to one embodiment: quadrature passive mixers (e.g., for the in-phase (I) and quadrature phase (Q) signal paths) In such an embodiment, RF input signal from the FEM 300 or 320 may be down-converted to LIF or VLIF signals that then may be sampled by separate ADCs (not shown) to provide I and Q baseband output signals to be sent to the receive baseband processor 412.

For quadrature phase-related passive mixers (not shown) may be driven by zero and ninety degree time-varying LO switching signals provided by a quadrature circuitry which may be configured to receive a LO frequency (fLO) from a local oscillator or a synthesizer, such as LO frequency of synthesizer 404. In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal provided by the HD FEM 300 and/or the FD FEM 320 may comprise a balanced signal, although the scope of the embodiments is not limited in this respect. The I and Q baseband output signals may be provided to a low-nose amplifier, such as amplifier circuitry 406 (FIG. 4) and/or to filter circuitry such as filter circuitry 408.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 404 may be a fractional-N synthesizer or a fractional N/N+1 synthesizer, although the scope of the embodiments is not limited in this respect as other types of frequency synthesizers may be suitable. For example, synthesizer circuitry 404 may be a delta-sigma synthesizer, a frequency multiplier, or a synthesizer comprising a phase-locked loop with a frequency divider. According to some embodiments, the synthesizer circuitry 404 may include digital synthesizer circuitry. An advantage of using digital synthesizer circuitry is that, although it may still include some analog components, its footprint may be scaled down much more than the footprint of corresponding analog synthesizer circuitry. In some embodiments, frequency input into synthesizer circuitry 404 may be provided by a voltage controlled oscillator (VCO), although that is not a requirement. A divider control input may further be provided by either the receive baseband processing circuitry 412 or the application processor 430 depending on the desired output frequency. In some embodiments, a divider control input may be determined from a look-up table (e.g., within a Wi-Fi card) based on a channel number and a channel center frequency as determined or indicated by the application processor 430.

In some embodiments, synthesizer circuitry 404 may be configured to generate a carrier frequency as the output frequency, while in other embodiments, the output frequency may be a fraction of the carrier frequency (e.g., one-half the carrier frequency, one-third the carrier frequency) In some embodiments, the output frequency may be a LO frequency (fLO).

FIG. 4 illustrates a functional block diagram of baseband processing circuitry 400 in accordance with some embodiments. The baseband processing circuitry 400 is one example of circuitry that may be suitable for use as the baseband processing circuitry, although other circuitry configurations may also be suitable. The baseband processing circuitry 400 may include a receive baseband processor (RX BBP) 412 for processing receive baseband signals provided by the radio IC circuitry and a transmit baseband processor (TX BBP) 416 for generating transmit baseband signals for the radio IC circuitry. The baseband processing circuitry 400 may also include control logic 406 for coordinating the operations of the baseband processing circuitry 400.

In some embodiments (e.g., when analog baseband signals are exchanged between the baseband processing circuitry and the radio IC circuitry), the circuitry 400 may include ADC 410 to convert analog baseband signals received from the radio IC circuitry to digital baseband signals for processing by the RX BBP 412. In these embodiments, the circuitry 400 may also include DAC 418 to convert digital baseband signals from the TX BBP 416 to analog baseband signals.

In some embodiments that communicate OFDM signals or OFDMA signals, such as through the baseband processor, the transmit baseband processor 416 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 412 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIGS. 3A and 3B, in some embodiments, the antennas 302, 322 and 328 may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 302, 322 and 328 may each include a set of phased-array antennas, although embodiments are not so limited.

Although the radio-architecture shown in FIGS. 3A, 3B and 4 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements. The software may be configured in a non-transitory computer readable medium such as a random access memory (RAM), read-only memory (ROM), electrically erasable programmable readable memory (EEPROM), magnetic storage device or optical storage device. The software may be configured to cause one or more of the receive baseband processor 412, transmit baseband processor 416, control logic 414, and/or application processor 430 to implement the functions described above.

The examples described below include FD Wi-Fi schedulers implemented at the AP 102 to mitigate effects of intra-BSS STA-STA interference in FD Wi-Fi systems. Joint DL-UL transmission at an FD-capable AP 102 can be enabled for legacy Wi-Fi STAs (potentially without changing the protocol for STAs). Depending on whether there is a concurrent UL transmission or not, the AP 102 may adopt different strategies to schedule the DL STA 104 for the transmission after reception of signals from the UL STA 106.

In the systems described in the examples, when pairing the UL STA 106 for joint DL-UL transmission, only DL STAs selected from among the STAs 104, 108, 110 and 112 that satisfy the STA-STA interference requirements can be selected to start FD DL transmission. In addition, the AP 102 can prioritize STAs with better channel quality under STA-STA interference in scheduling for FD DL to improve FD gain. Further, to improve fairness among STAs, the AP can prioritize or deprioritize STAs who have been recently scheduled in FD DL for HD DL transmissions.

The examples described below select an FD DL STA based on channel estimation, modify traditional schedulers to implement FD DL transmission using a joint fair FD+HD schedulers for FD DL transmission to improve fairness of FD+HD combined DL rate while providing an improvement over HD DL only schedulers.

As described above, existing systems use revised MAC protocols different from current 802.11 protocols to implement FD operation. These revisions may involve changes to frame structures, extra signaling and measurement, etc. For scheduling, existing systems rely on the AP to schedule all transmissions in the BSS. Because it is unlikely that all existing HI-D devices will be immediately be replaced by FD devices, it is preferable for FD devices, especially FD-capable APs, to be able to work with legacy devices that use legacy protocols.

The examples below describe new schedulers for FD Wi-Fi based on a MAC design implemented in the AP 102 that can work with legacy Wi-Fi STAs 104, 106, 108, 110 and 112 without changing the protocol in the STAs. The scheduling scheme can be applied to future versions of Wi-Fi standards as well and can be extended for joint DL-UI, scheduling. With reference to FIGS. 7A-7E, the proposed scheduling schemes are evaluated and compared to conventional HD Wi-Fi with system-level simulations Simulation results show that the example fair schedulers improve spectral efficiency of the system (up to approximately 2× in UL intense scenarios) and achieves good fairness in DL rate (≥0.94 Jain's fair index).

The examples below describe scheduling methods that operate only at the AP 102 and that change scheduling only for HD DL and FD DL. The STAs 104, 106, 108, 110 and 112 do not need to be aware of the concurrent transmission. In addition, the examples schedule HD DL and FD DL transmissions jointly to achieve fairness and increased FD throughput.

Initially, the system determines which UL DL STAs may be paired. A FD DL scheduling algorithm processes data on these STAs to implement the joint fair FD+HD schedulers. The examples below assume that the UL STA 106 first gets access to channel and that the AP 102 selects the FD DL STA 104 upon the reception of the UL transmission, based on the FD DL data rates of STA 104 and the other possible DL STAs, 108, 110 and 112 in the BSS 100. After receiving the first MAC header/first Aggregate MAC Protocol Data Unit (A-MPDU) sub-frame from the UL STA 106, AP 102 evaluates and selects STAs with DL traffic that meet a set of criteria, as described below. Note that this specific transmission procedure is presented as an example to explain the scheduler design. The scheduler, however, can be used in other scenario, such as when UL STA transmission starts with RTS. The scheduler design can also be extended to joint DL-UL scheduling, for example, when the AP 102 wins the CSMA/CA contention.

Figure 5:
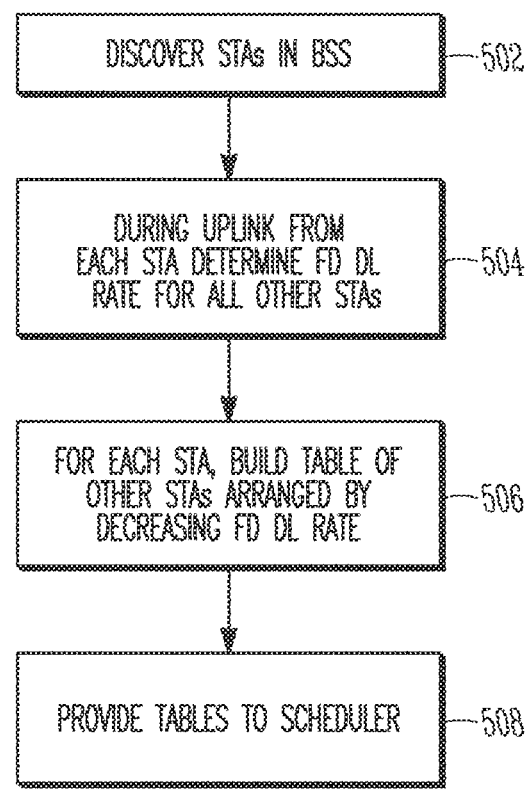
FIG. 5 is a flow-chart diagram showing an example method for building tables describing the ability to pair of the stations in the basic service set for opportunistic FD transmissions.

The process to obtain data for the scheduler is shown in FIG. 5. At block 502, the AP 102 discovers the STAs 104, 106, 108, 110 and 112 in the BSS 100. At block 504, when the AP 102 receives uplink data from one of the STAs the AP 102 determines the FD DL rate for at least one other STA in the BSS, as described below. As FD DL rates are determined, block 506 adds the DL STAs and their FD DL transmission rates to a table of potential FD DL STAs for the UL STA. In one embodiment the DL STAs may be arranged by decreasing FD DL transmission rate. At block 508, the tables are provided to the scheduler. The process shown in FIG. 5 may be run during a network initialization operation and/or may be run at regular or irregular intervals during the operation of the network to build and maintain a table of FD DL STAs that may be paired with each UL STA. The scheduling algorithms below may operate with data on less than all of the STAs in the BSS If no FD DL data is available for one STA to be paired with a UL STA, that one STA it is not included in the table and is not eligible to be considered as a FD DL STA when the AP receives UL data from the UL STA.

Detailed criteria to enable FD transmissions consider the following data for FD DL transmission. The FD DL STAs that meet the below criteria are STAs that are able to be paired with the UL STA.

The criteria include the signal to interference ratio (SIR) of all potential DL STAs. These ratios are shown in the inequalities (1) and (2).

$$\frac{SNR_{AP \to DL}}{INR_{UL \to DL}} \geq TH_{DATA} \tag{1}$$

$$\frac{SNR_{AP \to UL}}{INR_{DL \to UL}} \geq TH_{ACK} \tag{2}$$

where $SNR_{AP \to DL}$ is the signal-to-noise ratio (SNR) from the AP 102 to the DL STA 104; $SNR_{AP \to UL}$ is the SNR from the AP 102 to the UL STA 106; $INR_{UL \to DL}$ is the interference-to-noise ratio from UL STA 106 to DL STA 104; $INR_{DL \to UL}$ is the interference-to-noise ratio from DL STA 104 to UL, STA 106; $TH_{DATA}$ is the SIR threshold for data transmissions, and $TH_{ACK}$ is the SIR threshold for ACK transmissions.

A second criterion concerns time alignment. The length of FD DL data transmission is desirably short enough such that the data transmission from AP 102 to FD DL STA 104 ends no later than the end of data transmission from UL STA 106 to AP 102.

To find candidate FD DL STAs that meet the above criteria, the AP 102 takes the following measurements. $SNR_{AP \to DL}$, $SNR_{AP \to UL}$, $INR_{UL \to DL}$, and $INR_{DL \to UL}$ for all STAs in the BSS that may be paired with the UL STA 106. In one embodiment, the STAs send, to the AP, the strength of the received signal from the AP 102 to STAs 104, 106, 108, 110 and 112, i.e., $SNR_{AP \to DL}$ and $SNR_{AP \to UL}$. In this implementation, each of the STAs 104, 106, 108, 110 and 112 also measures the signal strength from the other STAs in the BSS 100 and sends the measurements of interference from other STAs to the AP 102. The AP 102 collects the measurements from STAs 104, 106, 108, 110 and 112 and builds a table containing a list of UL-DL STAs that satisfy the inequalities (1) and (2) and can be paired. The AP can calculate an FD DL transmission data rate for each UL-DL pair based on this data.

In an alternative embodiment, the table of UL-DL STAs that can be paired may be generated by collecting data on the FD DL transmission rate from the AP 102 to each of the other STAs in the BSS while the AP 102 is receiving, decoding and processing UL data from one of the STAs. This data may be obtained, for example, by the AP 102 transmitting multiple short null data packets from the AP 102 to a selected one of the other STAs in the BSS, each null packet transmitted with a respectively different MCS. The AP 102 may monitor the ACKs from the transmissions to set the transmission data rate as the highest data rate MCS that received an ACK. This process is repeated for each other STA to obtain data for the possible pairing of FD DL STAs with the UL STA. The entire process is repeated with all STAs in the BSS serving as the UL STA.

In another alternative embodiment, the AP initiates the UL transmission by sending a quality of service (QoS) contention free (CF) poll packet to the UL STA and then sends the FD DL null packets to the other STAs during the interval when the UL STA responds to the QoS CF poll packet.

In yet another alternative embodiment, the AP may build the table over time by attempting FD DL transmissions to selected ones of the other STAs while receiving data from each STA acting as the UL STA and monitoring the ACKs from the FD DL STAs to determine which of the other STAs may be paired with each STA acting as the UL STA.

In legacy Wi-Fi systems, channel access is contention-based (e.g. CSMA/CA), thus the AP may not be able to schedule UL and DL transmissions jointly. The scheduling algorithms presented below concern the scheduling of FD DL transmissions without considering the scheduling of UL transmissions. Using the channel measurements described above and information about the UL STA, the AP 102 can select a DL STA from the list of FD DL STAs meeting the basic criteria. The AP 102 can use different schedulers to achieve different goals, i.e., fairness, total DL rate, etc. In legacy Wi-Fi, the basic HD DL scheduler is a round-robin scheduler. For a round-robin scheduler, the AP 102 maintains a queue to keep track of the sequence of DL STAs which have DL traffic. When the AP 102 has access to a channel, the AP 102 selects the first DL STA in queue for DL transmission. When the ACK indicates a successful transmission, the AP 102 moves the DL STA to the end of the queue. The examples described below modify the simple round-robin scheduler to implement the fair-rate joint FD+HD scheduler. Although the materials below describe "moving" STAs in queues, it is understood that the queue includes data values representing the STAs and it is these data values that are actually moved. The operations describing moving the STAs is a shorthand to avoid unduly prolix descriptions.

In one type of round-robin scheduler, the AP selects, for FD DL transmission, the first DL STA in the queue that can be paired with the UL STA. As the transmission rate of FD DL link can be much lower than the rate of HD DL, due to the MCS used to counteract the STA-STA interference between the UL STA and the FD DL STA, there can be two types of implementations once the AP receives an ACK for FD DL transmission. First, the AP can choose to move the FD DL STA to the end of the queue after FD DL transmission as in regular round-robin operation. In this instance, due to the difference between FD and I-ID transmission rates, the DL throughput performance may be degraded. Second, the AP can also choose not to move the FD DL STA to the end of the queue after FD DL transmission which may result in higher throughput for pair-able DL STAs. The fair-rate joint FD+HD scheduler uses the two different implementation strategies. As described below, the fair-rate joint FD+HD scheduler adopts a mixed strategy to determine whether to move the scheduled DL STA to the end of the queue, allowing both FD and HD DL transmissions to occur.

In order to achieve better throughput in FD) DL transmission, the fair-rate joint FD+HD scheduler performs FD DL only with STAs having a good FD DL transmission rates. The following are example scheduling methods that have low complexity and require no further measurement or information:

1. Max-N-rate scheduler: For each UL STA, the AP finds an integer number, N, DL STAs from pair-able DL STAs in the table that have the largest FD DL transmission rates for the UL STA; The AP the selects the STA from the N DL STAs which is the highest in the queue to be scheduled for FD DL transmission 1a. Max-rate scheduler: This is a special case of Max-N-rate scheduler with N=1. For this scheduler, the AP only selects the DL STA that has highest FD DL rate from all pair-able DL STAs to be scheduled for FD DL transmission, regardless of the position of the selected STA in the queue.

2. Max-N-rate-ratio scheduler: For each UL STA, the AP finds N DL STAs from the table of pair-able DL STAs that have larger ratios between FD DL rate and HD DL rate (the HD DL rate is the DL rate when there is no STA-STA interference) than the other STAs in the table. The AP then selects the STA from the N DL STAs which is the highest in the queue as the STA to be scheduled for FD DL transmission.

3. Min-rate-threshold scheduler: The AP sets a single FD DL transmission rate threshold value, $TH_{FDDL}$, for all UL STAs or sets separate $TH_{FDDL}$ values for each UL STA. The AP then selects the pair-able STA that is highest in the queue and that has a FD DL transmission rate that exceeds $TH_{FDDL}$.

The Max-n-rate, max-n-rate-ratio and Min-rate-threshold schedulers favor DL STAs with higher FD DL transmission rates and, thus can improve the throughput gain from FD DL transmission. The Min-rate-threshold scheduling can be combined with other schedulers but the AP may need to adjust the FD DL transmission rate threshold for different scenarios to achieve higher FD gain. As described above, two implementation options can be considered to adjust the position of the FD DL STA after the AP receives ACK: 1) the AP may move the STA to the end of the queue as in a regular round-robin operation or 2) AP can choose not to move the FD DL STA to the end of the queue after FD DI, transmission.

One problem with FD DL scheduling is fairness among users In legacy Wi-Fi systems, the AP does not schedule UL transmissions, thus joint scheduling of UL and DL transmissions is not applicable. In these instances, the AP may use H-ID and FD in DL transmission. As the HD and FD transmission rates can be quite different, the example fair rate FD+HD scheduler uses both HD and FD transmissions to achieve fairness in (FD+HD) DL transmission time does not guarantee fairness in terms of transmission rate.

As the FD DL rate can be much lower than HD-DL rate, if we simply move the FD) DL STA to the end of the queue after receiving ACK for the FD DL transmission, the scheduled FD DL STA loses its chance to be scheduled in HD DL and the overall throughput performance for the DL STA may be worse than for STAs being scheduled in HD DL only. To overcome this problem, the scheduler moves the FD DL STA to the end of the queue only if the DL STA has already received a sufficient amount of data during its scheduling opportunity. An example of the algorithm is shown in FIGS. 6A, 6B and 6C.

In block 602, the AP generates a queue of DL data for each STA 104, 106, 108, 110 and 112 in the BSS 100. At block 604, there is CSMA/CA contention for the channel. If the AP wins the contention, the queue is treated as a conventional round robin queue. At block 606 the AP selects the first STA in the queue and, at block 608, transmits $Q_i$ bytes/packets as HD) DL data to the selected STA. At block 610 the AP moves the selected STA to the end of the queue and returns control to block 604 to wait for the next contention $Q_i$ is an amount of DL data to be transmitted by the AP for the ith STA in the BSS.

If at block 604, the AP does not win the contention, a STA in the BSS has won the contention and the AP receives UL data from the STA at block 620. At block 622 the AP determines whether queue includes a FD DL STA that is pair-able with the UL STA and which satisfies one of the schedulers described above. If no such FD DL STA is identified at block 622, control transfers to block 604 to await the next contention interval. If an FD DL STA is identified at block 622 the AP downloads N bites/packets to the identified STA at block 624. The value of N is determined by the size of the UL transmission and the MCS applied to the DL data. At block 626, the AP, after receiving an ACK from the FD DL STA, adds the value N to a value $C_i$ that is a counter which represents an amount of data that has been transmitted to the ith STA. The value $C_i+N$ is compared to $Q_i$ at block 626. If $C_i+N$ is not greater than $Q_i$ at block 626, control transfers to block 604 to await the next contention and possibly further FD DL operations for the ith STA. If, however, at block 626, $C_i+N$ is greater than $Q_i$ at block 626, block 628 sets $C_i$ to $C_i$ modulo $Q_i$, moves the ith STA to the end of the queue and transfers control to block 604.

Figure 6A:
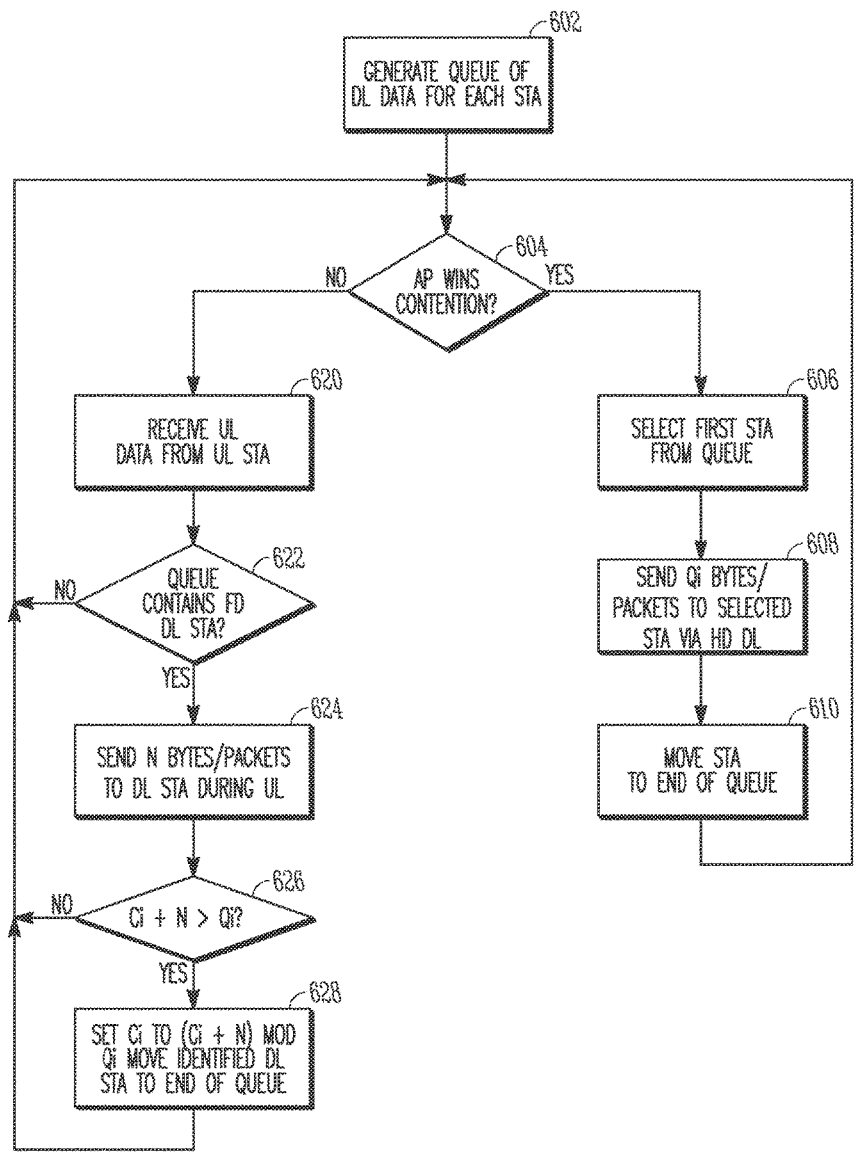
FIGS. 6A, 6B and 6C are a flow-chart diagrams showing an example opportunistic FD down-link (DL) scheduler.
Figure 6B:
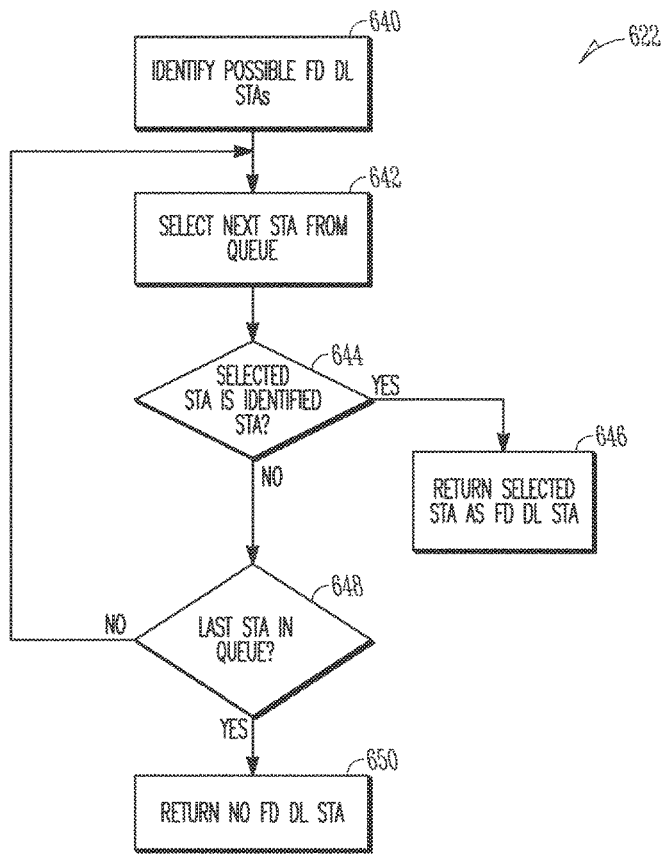
Figure 6C:
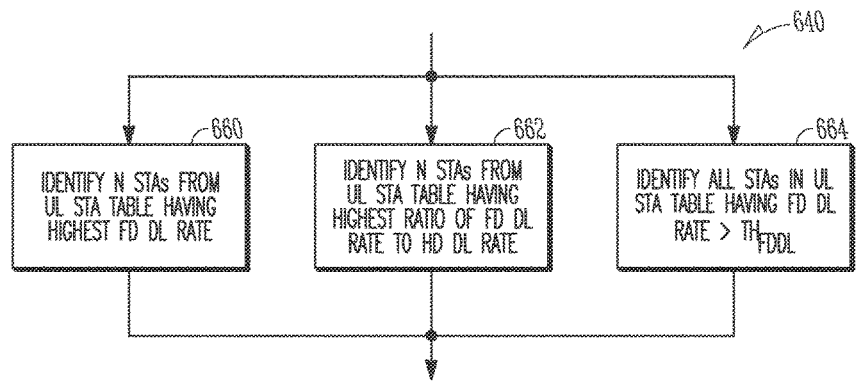

FIGS. 6B and 6C show an example implementation of block 622 in FIG. 6A. At block 640, the AP identifies possible FD DL STAs using one of the scheduling algorithms described above. Details of this block are shown in FIG. 6C. As shown in block 660 of FIG. 6C, the AP may identify N STAs from the table for the UL STA that have higher FD DL transmission rates than the remaining STAs in the list. Alternatively, at block 662, the AP may identify N possible DL STAs having the higher ratio of FD DL rate to HD DL rate from the table of pair-able DL STAs for the UL STA. As a third alternative, at block 664, the AP may identify all STAs in the UL table having FD DL data rates greater than $TH_{FDDL}$.

Returning to FIG. 6B, once the possible FD DL STAs have been identified at block 640, the AP selects the next STA from the queue at block 642. At block 644 the AP determines whether the selected STA is one of the identified FD DL STAs. If the selected STA is one of the identified FD DL STAs, then this STA is returned, at block 646, as the selected FD DL STA. If the STA selected in block 642 is determined not to be one of the identified FD DL STAs at block 646, block 648 determines whether the selected STA is the last STA in the queue. If the selected STA is not the last STA in the queue control transfers to block 642 to select the next STA from the queue. If, however, the selected STA is the last STA in the queue, step 650 returns an indication that there is no eligible FD DL STA.

As can be seen from FIGS. 6A, 6B and 6C, the AP uses a modified round robin scheduler for HD DL scheduling. When AP gets access to channel after contending with STAs, AP selects the first STA in the queue, the ith STA, and sends N FD DL packets (or bytes) to the STA. The AP then moves the current STA to the end of the queue if $C_i+N>Q_i$ and updates the packet counter, $C_i=C_i+N \mod Q_i$. If the ith STA is not moved to the end of the queue then it is eligible for the next HD DL operation when the AP wins the contention. As described above, after the HD DL operation, the STA is moved to the end of the queue.

The scheduling algorithms described above have been tested in a fully standardized legacy Wi-Fi system level simulator In this simulation, the number of DL STAs is 9 while the number of UL STAs ranges between 1 and 4. Also in the simulation, the rate fair joint FD+HD DL scheduler uses the Max-N-rate scheduler for FD DL where N=2.

Figure 7A:
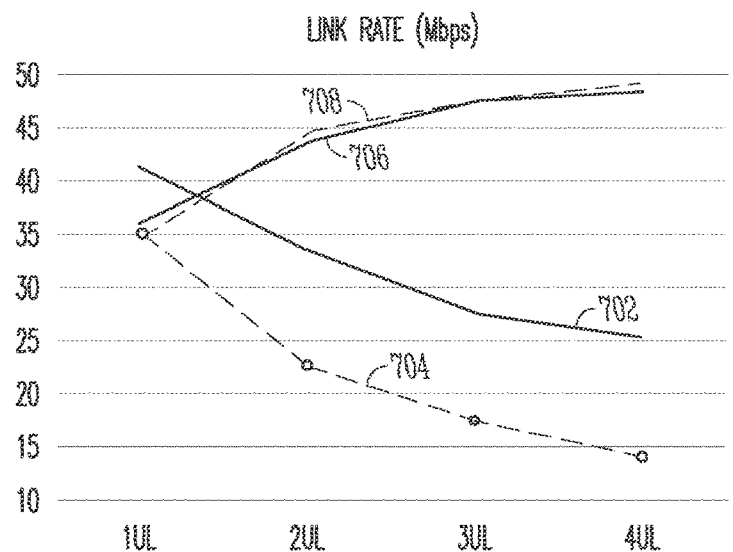
FIGS. 7A, 7B, 7C, 7D, 7E and 7F are graphs that are useful for describing the operation of the example scheduler shown in FIGS. 6A, 6B and 6C.
Figure 7B:
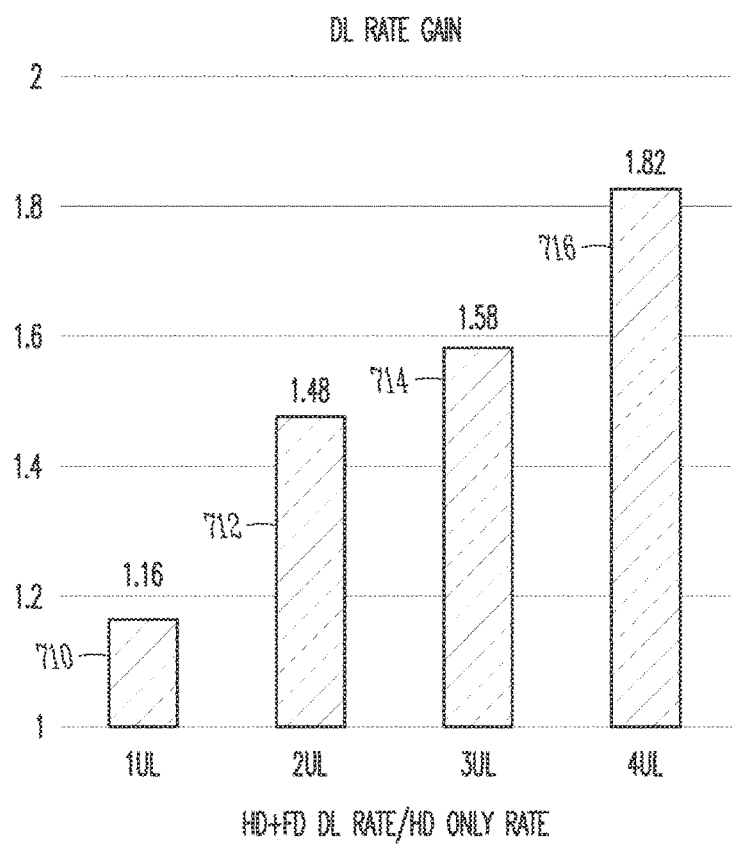
Figure 7C:
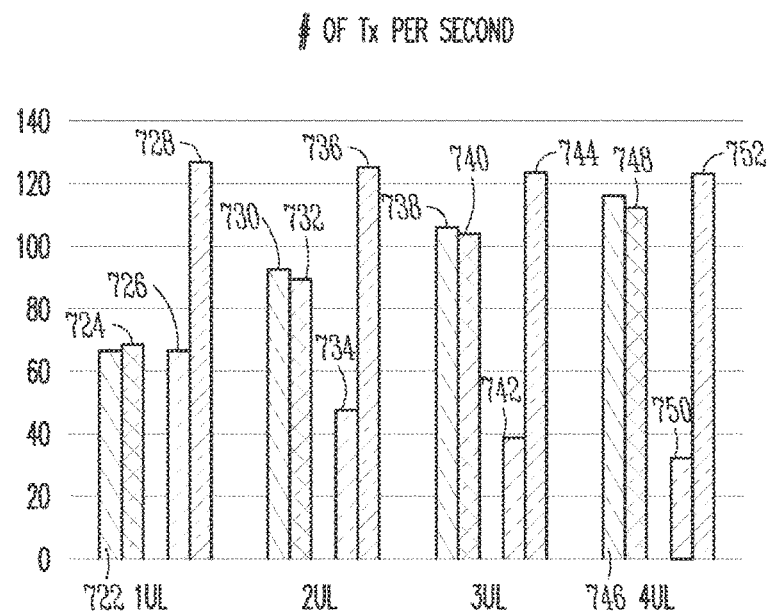
Figure 7D:
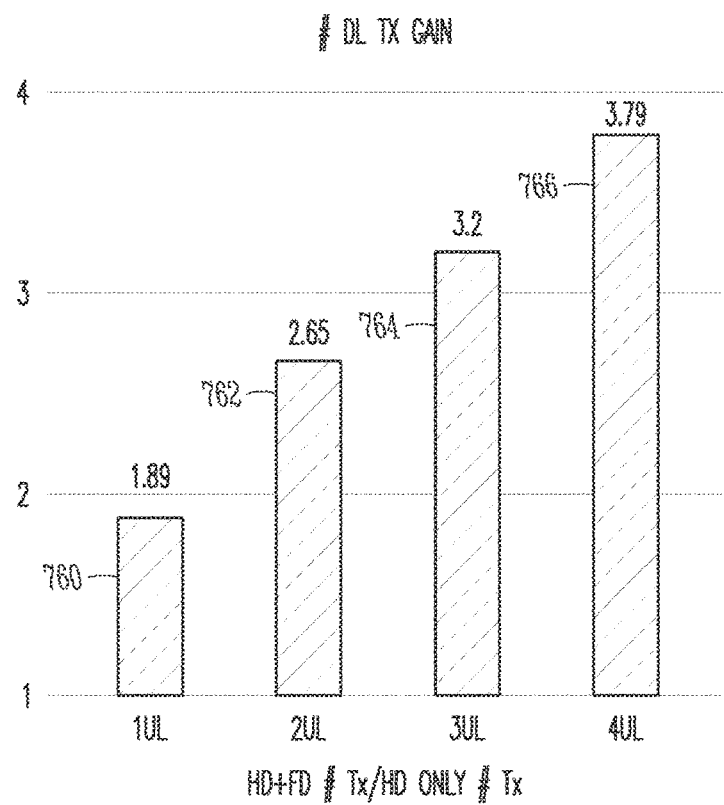

FIGS. 7A and 7B illustrate the performance of naïve round robin HD DL scheduler in rate (FIG. 7A) and DL rate gain (FIG. 7B) respectively. Curve 704 shows the DL rate for HD only while curve 702 shows the transmission rate for the combined FD+HD DL round robin scheduler. Curve 708 shows the HD UL rate for an HD only round robin scheduler and curve 706 shows the UL rate for the FD+HD round robin scheduler. FIG. 7B is a bar-graph showing the improvement in DL rate based on respective simulations including 1 UL STA (bar 710), 2 UL STAs (bar 712), 3 UL STAs (bar 714) and 4 UL STAs (bar 716). FIGS. 7C and 7D show similar data except for number of DL transmissions rather than transmission rate In FIG. 7C, bar 722 shows the number of UL packets for an HD only naïve round robin scheduler. Bar 724 shows the number of UL packets for the round robin FD DL scheduler. Bar 726 shows the number of DL packets for an HD only scheduler and bar 728 shows the number of DL packets for the round robin FD DL scheduler. Bars 722, 724, 726 and 728 show the simulation results when there is 1 UL STA. Bars 730, 732, 734 and 736 show the same data when there are 2 UL STAs Bars 738, 740, 742 and 744 show the same data when there are 3 UL STAs. Bars 746, 748, 750 and 752 show the same data when there are 4 UL STAs. FIG. 71) shows the gain in number of transmissions when there is 1 UL STA (bar 760), 2 UL STAs (bar 762), 3 UL STAs (bar 764) and 4 UL STAs (bar 766). As can be seen from FIGS. 7A through 7D, In uplink intense scenarios (4 UL STAs), basic round robin FD DL scheduler provides over 1.8× DL rate gain and about 3.8× increase in DL transmission opportunities, improving DL throughput and DL quality of service.

Figure 7E:
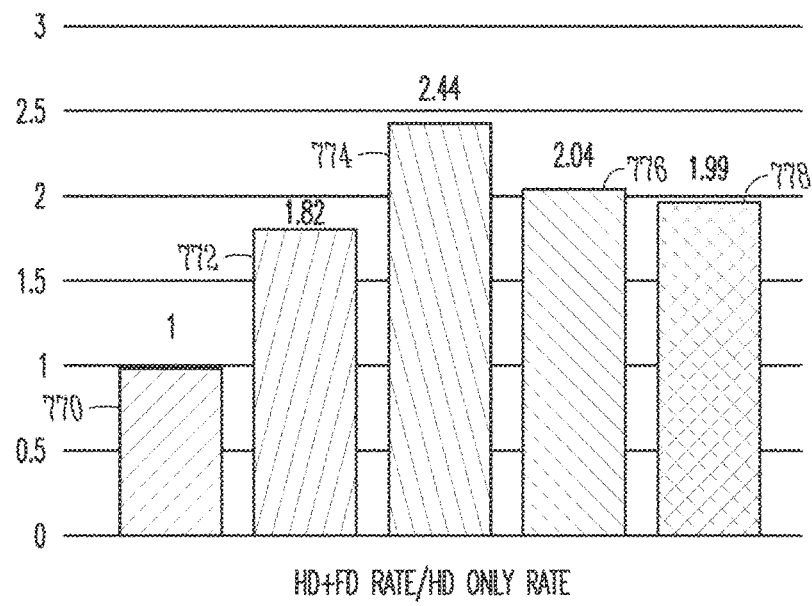

FIG. 7E shows the FD DL rate gain of different schedulers. The max-rate scheduler (bar 774) provides most gain in DL rate while fair joint FD+HD scheduler (bar 778) has similar rate performance as the max-two-rate scheduler (bar 776). Schedulers that prioritize FD DL STA with higher DL rate (bars 774, 776 and 778), achieve higher DL rate than the HD only naïve round robin scheduler (bar 770) e.g., more than two-times the DL rate. The prioritizing schedulers also perform better than a FD round robin scheduler (bar 772).

Figure 7F:
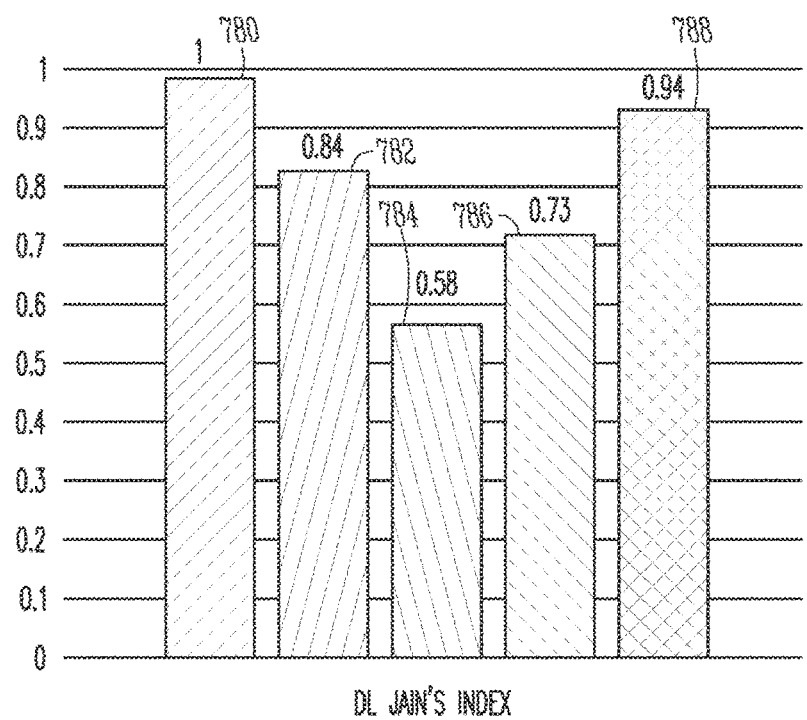

FIG. 7F illustrates the fairness of different schedulers using Jain's index, which is defined by equation (3)

$$J(r_1, r_2, Kr_n) = \frac{\left(\sum_{i=1}^{n} r_i\right)^2}{n \cdot \sum_{i=1}^{n} r_i^2} \qquad (3)$$

where $r_i$ is the DL rate of DL STA i.

Schedulers prioritizing high rate FD DL STAs, such as max-rate (bar 784) and max-two-rate (bar 786), show higher gain in DL rate but may not be fair. The rate fair joint FD+HD scheduler (bar 788) achieves the benefit from opportunistic scheduling while improving the fairness amongst DL STAs (0.94 in Jain's Index). Fair FD+HD scheduler is also fairer than naïve fair FD DL scheduler, i.e., round-robin scheduler (bar 782). For comparison sake, the fairness of the HD only round robin scheduler is shown as bar 780.

The DL scheduling algorithms can be extended for joint DL-UL scheduling. One extension for applying the scheduling strategy described above to joint DL-UL scheduling can be that selecting the UL STA based on round-robin scheduling first and then selecting the DL STA according to the scheduling procedure described above. As there may be DL STAs that are not able to pair with any UL STA, the UL round-robin scheduler should include scheduling no UL STA as one possible scheduling decision and maintain opportunities for DL STAs to be sent HD DL data.

EXAMPLES

Example 1 may include an apparatus for use in a full-duplex (FD) capable access point (AP) of a wireless basic service set (BSS) including a plurality of stations (STAs), the apparatus comprising: an interface; and a processor configured to: decode uplink (UL) data received via the interface from a UL STA in the BSS; select a downlink (DL) STA from the plurality of STAs in the BSS from a queue of DL STAs based on a predetermined FD DL transmission rate from the AP to the DL STA while the AP is decoding the UL data from the UL STA; and provide, to the interface, an amount of data to be transmitted as an FD transmission to the selected DL STA while the processor is decoding the data from the UL STA.

Example 2 may include the apparatus of example 1 or any other example herein, wherein the processor is further configured to: receive an acknowledgement message (ACK) from the DL STA; and maintain a position of the DL STA in the queue while a total amount of data including the amount of data combined with other amounts of data transmitted to the DL STA is less than a threshold amount of data.

Example 3 may include the apparatus of example 2 or any other example herein, wherein the processor is further configured to: decode further UL data received via the interface from one of the STAs in the BSS; select the DL STA based on its predetermined FD DL transmission rate while the processor is decoding the further UL data from the one STA; provide, to the interface, a further amount of data to be transmitted as an FD transmission to the selected DL STA while the processor is decoding the further UL data; decode a further ACK from the DL STA; and responsive to decoding the further ACK move the DL STA to a last position in the queue when the amount of data combined with the further amount of data and the other amounts of data transmitted to the DL STA is greater than or equal to the threshold amount of data.

Example 4 may include the apparatus of example 2, wherein the processor is configured to cause the interface to: transmit a further amount of data to the DL STA as a half-duplex (HD) transmission; decode an ACK for the further amount of data, wherein the total amount of data is a sum of the amount of data and the further amount of data, and move the DL STA to a last position in the queue, responsive to decoding the ACK.

Example 5 may include the apparatus of example 1 or any other example herein, wherein the processor is configured to select the DL STA from the queue as a first STA in the queue for which a FD DL transmission rate from the AP to the selected STA while the processor is decoding the UL data from the UL STA is greater than a threshold transmission rate.

Example 6 may include the apparatus of example 1 or any other example herein, wherein BSS includes an integer. M, STAs and the processor is configured to: identify N STAs among the M STAs in the BSS, where N is an integer less than M, and where each of the identified N STAs has a higher DL transmission rate than any of the other M-N STAs in the BSS; and select, as the DL STA, one of the N identified STAs, which one identified STA is highest in the queue among the N identified STAs.

Example 7 may include the apparatus of example 6, or any other example herein wherein N is equal to 1.

Example 8 may include the apparatus of example 1 or any other example herein, wherein the BSS includes an integer. M, STAs and the processor is configured to: calculate, for each of the M STAs in the BSS, a ratio of a) the FD DL transmission rate for the STA while the processor is decoding data from the UL STA to b) a half-duplex (HD) transmission rate for the STA while the processor is not decoding UL data from any STA in the BSS, and select the FD DL STA from the queue as a first STA in the queue among an integer, N, STAs, where N is less than M, the N STAs having ratios that are greater than the ratios of the M-N other STAs in the BSS.

Example 9 may include the apparatus of example 1 or any other example herein, wherein the processor is configured to: prior to decoding the UL data from the UL STA, assign a threshold FD DL transmission rate to each STA in the BSS for UL transmissions from the STA to the AP; and while the processor is decoding the UL data from the UL STA, select the FD DL STA as the first STA in the queue having a FD DL transmission rate greater than the threshold assigned to the UL STA.

Example 10 may include the apparatus of example 9, wherein the threshold FD DL transmission rate is a single rate assigned to all STAs in the BSS.

Example 11 may include the apparatus of example 9, wherein the threshold FD DL transmission rate is different for each STA in the BSS.

Example 12 may include the apparatus of example 1 or any other example herein, wherein processor is configured to access the queue as a part of a round-robin scheduling algorithm.

Example 13 includes a method for scheduling full-duplex (FD) downlink (DL) transmissions from an access point (AP) to a plurality of stations (STAs) of a wireless basic service set (BSS), the method comprising: decoding, by a processor of the AP, uplink (UL) data received from a UL STA in the BSS; selecting, by the processor, a downlink (DL) STA of the plurality of STAs in the BSS from a queue of DL STAs based on a predetermined FD DL transmission rate from the AP to the DL STA while the AP is decoding the UL data from the UL STA; providing, by the processor, an amount of data to be transmitted as an FD transmission to the selected DL STA while the AP is decoding the data from the UL STA; providing, by the processor, a further amount of data to be transmitted to the DL STA as a half-duplex (HD) transmission; and increasing, by the processor, the amount to be transmitted to the DL STA by the further amount of data.

Example 14 may include the method of example 13 or any other example herein, further comprising: decoding respective first and second acknowledgement messages (ACKs) for the amount of data and the further amount of data, the ACKs indicating successful transmission of the amount of data and the further amount of data to the DL STA; maintaining a position of the DL STA in the queue responsive to decoding the first ACK; and moving, by the processor, the DL STA to a last position in the queue, responsive to decoding the second ACK.

Example 15 may include the method of example 13 or any other example herein, further comprising selecting, by the processor, the DL STA from the queue as a first STA in the queue for which a FD DL transmission rate from the AP to the selected STA while the processor is decoding the UL data from the UL STA is greater than a threshold transmission rate.

Example 16 may include the method of example 13 or any other example herein, wherein the BSS includes an integer, M, STAs and the method further comprises: identifying N STAs among the M STAs in the BSS, where N is an integer less than M. and where each of the identified N STAs has a higher FD DL transmission rate than any of the other M-N STAs in the BSS, selecting, by the processor, as the DL STA, one STA of the N identified STAs, which one identified STA is highest in the queue among the N identified STAs.

Example 17 may include the method of example 13 or any other example herein, wherein the BSS includes an integer, M, STAs and the method further comprises: calculating, by the processor, for each STA in the BSS, a ratio of a) the FD DL transmission rate for the STA while the processor is decoding data from the UL STA to b) a half-duplex (HD) transmission rate for the STA while the processor is not decoding UL data from any STA in the BSS; and selecting, by the processor, the FD DL STA from the queue as a first STA in the queue among an integer, N, STAs, where N is less than M, the N STAs having ratios that are greater than the ratios of the M-N other STAs in the BSS.

Example 18 may include the method of example 13 or any other example herein, further comprising: prior to decoding the UL data from the UL STA, assigning, by the processor, a threshold FD DL data rate to each STA in the BSS for UL transmissions from the STA to the AP; and while the processor is decoding the UL data from the UL STA, selecting the FD DL STA as the first STA in the queue having a FD DL data rate greater than the threshold assigned to the UL STA.

Example 19 may include the method of example 13 or any other example herein, further comprising accessing the queue, by the processor, as a part of a round-robin scheduling algorithm.

Example 20 may include a non-transitory computer readable medium including program instructions that, when executed, are configured to cause a processor in an access point (AP) of a basic service set (BSS) to: decode uplink (UL) data received via the interface from a UL STA in the BSS; select a downlink (DL) STA from a plurality of STAs in the BSS from a queue of DL STAs based on a predetermined FD DL transmission rate from the AP to the DL STA while the AP is decoding the UL data from the UL STA; provide an amount of data to be transmitted as an FD transmission to the selected DL STA while the AP is decoding the data from the UL STA; decode an acknowledgement message (ACK) from the DL STA indicating successful transmission of the amount of data from the AP to the DL STA; and maintain a position of the DL STA in the queue while the amount of data successfully transmitted to the DL STA is less than a threshold amount of data.

Example 21 may include the non-transitory computer readable medium of example 20 or any other example herein, wherein the program instructions are further configured to cause the processor to: decode further UL data received via the interface from one of the STAs in the BSS; select the DL STA based on its predetermined FD DL transmission rate while the processor is decoding the further UL data from the one STA; provide, to the interface, a further amount of data to be transmitted as an FD transmission to the selected DL STA while the processor is decoding the further UL data; decode a further ACK from the DL STA; and responsive to decoding the further ACK move the DL STA to a last position in the queue when the amount of data combined with the further amount of data and the other amounts of data transmitted to the DL STA is greater than or equal to the threshold amount of data.

Example 22 may include the non-transitory computer readable medium of example 20 or any other example herein, wherein the program instructions are further configured to cause the processor to: provide a further amount of data to be transmitted to the DL STA as a half-duplex (HD) transmission; decode a further ACK from the DL STA indicating successful transmission of the further amount of data; and responsive to decoding the further ACK, move the DL STA to a last position in the queue.

Example 23 may include the non-transitory computer readable medium of example 20 or any other example herein, wherein the program instructions are further configured to cause the processor to select the DI. STA from the queue as a first STA in the queue for which a FD DL transmission rate from the AP to the selected STA while the processor is decoding the UL data from the UL STA is greater than a threshold transmission rate.

Example 24 may include the non-transitory computer readable medium of example 20 or any other example herein, wherein the BSS includes an integer, M, STAs, and the program instructions are further configured to cause the processor to: identify N STAs among the M STAs in the BSS, where N is an integer less than M. and where each of the identified N STAs has a higher FD DL transmission rate than any of the other M-N STAs in the BSS; and select, as the DL STA, one STA of the N identified STAs, which one identified STA is highest in the queue among the N identified STAs.

Example 25 may include the non-transitory computer readable medium of example 20 or any other example herein, wherein the BSS includes an integer, M, STAs and the program instructions are further configured to cause the processor to: calculate for each STA in the BSS, a ratio of a) the FD DL transmission rate for the STA while the processor is decoding data from the UL STA to b) a half-duplex (HD) transmission rate for the STA while the processor is not decoding UL data from any STA in the BSS, and select the FD DL STA from the queue as a first STA in the queue among an integer, N, STAs, where N is less than M, the N STAs having ratios that are greater than the ratios of the M-N other STAs in the BSS.

Example 26 may include the non-transitory computer readable medium of example 20 or any other example herein, wherein the program instructions are further configured to cause the processor to: prior to decoding the UL data from the UL STA, assign a threshold FD DL data rate to each STA in the BSS for UL transmissions from the STA to the AP; and while the processor is decoding the UL data from the UL STA, select the FD DL STA as the first STA in the queue having a FD DL data rate greater than the threshold assigned to the UL STA.

Example 27 may include the non-transitory computer readable medium of example 20 or any other example herein, wherein the program instructions are further configured to cause the processor to access the queue as a part of a round-robin scheduling algorithm.

Example 28 includes an apparatus configured to schedule full-duplex (FD) downlink (DL) transmissions from an access point (AP) to a plurality of stations (STAs) of a wireless basic service set (BSS), the apparatus comprising: means for decoding uplink (UL) data received from a UL STA in the BSS; means for selecting a downlink (DL) STA of the plurality of STAs in the BSS from a queue of DL STAs based on a predetermined FD DL transmission rate from the AP to the DI. STA while the AP is decoding the UL data from the UL STA; means for providing an amount of data to be transmitted as an FD transmission to the selected DL STA while the AP is decoding the data from the UL STA; means for providing a further amount of data to be transmitted to the DL STA as a half-duplex (HD) transmission; and means for increasing the amount to be transmitted to the DL STA by the further amount of data.

Example 29 may include the apparatus of example 28 or any other example herein, further comprising: means for decoding respective acknowledgement messages (ACKs) for the amount of data and the further amount of data, the ACKs indicating successful transmission of the amount of data and the further amount of data to the DL STA, and means for moving the DL STA to a last position in the queue, responsive to decoding the respective ACKs.

Example 30 may include the apparatus of example 28 or any other example herein, further comprising means for selecting the DL STA from the queue as a first STA in the queue for which a FD DL transmission rate from the AP to the selected DL STA, while the processor is decoding the UL data from the UL STA, is greater than a threshold transmission rate.

Example 31 may include the apparatus of example 28 or any other example herein, further comprising means for selecting a value representing the DL STA from the queue the selected value representing the DL STA having the FD DL transmission rate that is greater than any other transmission rate from the AP to the other STAs in the BSS while the means for decoding is decoding the UL data from the UL STA.

Example 32 may include the apparatus of example 28 or any other example herein, wherein the BSS includes an integer, M, STAs and the apparatus further comprises: means for calculating, for each STA in the BSS, a ratio of a) the FD DL transmission rate for the STA while the processor is decoding data from the UL STA to b) a half-duplex (HD) transmission rate for the STA while the processor is not decoding UL data from any STA in the BSS; and means for selecting, by the processor, a value from the queue, the selected value representing the FD DL STA that is a first STA represented by values in the queue among an integer, N, STAs having ratios that are greater than the ratios of the M-N other STAs in the BSS, where N is less than M.

Example 33 may include the apparatus of example 28 or any other example herein, further comprising: means for assigning, prior to decoding the UL data from the UL STA, a threshold FD DL data rate to each STA in the BSS for UL transmissions from the STA to the AP, and means for selecting the FD DL STA as the first STA in the queue having a FD DL data rate greater than the threshold assigned to the UL STA during the decoding of the UL data from the UL STA.

Example 34 may include the method of example 28 or any other example herein, further comprising means for accessing the queue as a part of a round-robin scheduling algorithm.

The foregoing description of one or more implementations provides illustration and description, but is not intended to be exhaustive or to limit the scope of the embodiments to the precise form disclosed. Modifications and variations are possible in light of the above teachings or may be acquired from practice of various implementations of the embodiments.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

The invention claimed is:

1. An apparatus for use in a full-duplex (FD) capable access point (AP) of a wireless basic service set (BSS) including a plurality of stations (STAs), the apparatus comprising:
   an interface; and
   a processor configured to:
   decode uplink (UL) data received via the interface from a UL STA in the BSS;
   select a downlink (DL) STA from the plurality of STAs in the BSS from a queue of DL STAs, wherein the selected DL STA is a first STA in the queue for which a FD DL transmission rate from the AP to the selected STA is greater than a threshold rate while the processor is decoding the UL data from the UL STA; and
   provide, to the interface, an amount of data to be transmitted as an FD transmission to the selected DL STA while the processor is decoding the data from the UL STA.

2. The apparatus of claim 1, wherein the processor is further configured to:
   decode an acknowledgement message (ACK) from the DL STA; and
   responsive to decoding the ACK, maintain a position of the DL STA in the queue while a total amount of data including the amount of data combined with other amounts of data transmitted to the DL STA is less than a threshold amount of data.

3. The apparatus of claim 2, wherein the processor is further configured to:
   decode further UL data received via the interface from one of the STAs in the BSS;
   select the DL STA while the processor is decoding the further UL data from the one STA;
   provide, to the interface, a further amount of data to be transmitted as an FD transmission to the selected DL STA while the processor is decoding the further UL data;
   decode a further ACK from the DL STA; and
   responsive to decoding the further ACK move the DL STA to a last position in the queue when the amount of data combined with the further amount of data and the other amounts of data transmitted to the DL STA is greater than or equal to the threshold amount of data.

4. The apparatus of claim 2, wherein the processor is configured to:
   cause the interface to transmit a further amount of data to the DL STA as a half-duplex (HD) transmission;
   decode an ACK for the further amount of data, wherein the total amount of data is a sum of the amount of data and the further amount of data; and
   move the DL STA to a last position in the queue, responsive to decoding the ACK.

5. The apparatus of claim 1, wherein the BSS includes an integer, M, STAs and the processor is configured to:
  identify N STAs among the M STAs in the BSS, where N is an integer less than M, and where each of the identified N STAs has a FD DL transmission rate, while the processor is decoding data from the UL STA, that is greater than the threshold rate; and
  select, as the DL STA, one STA of the N identified STAs, which one identified STA is highest in the queue among the N identified STAs.

6. The apparatus of claim 5, where N is equal to 1.

7. The apparatus of claim 1, wherein the BSS includes an integer, M, STAs and the processor is configured to:
  calculate, for each of the M STAs in the BSS, a ratio of a) the FD DL transmission rate for the STA while the processor is decoding data from the Lit STA to b) a half-duplex (HD) transmission rate for the STA while the processor is not decoding LL data from any STA in the BSS; and
  select the FD DL STA from the queue as a first STA in the queue among an integer, N STAs, where N is less than M, the N STAs having ratios that are greater than the ratios of the M-N other STAs in the BSS and where the FD DL transmission rate for the N selected STA, while the processor is decoding data from the UL STA, is greater than the threshold rate.

8. The apparatus of claim 1, wherein the processor is configured to:
  prior to decoding the UL data from the UL STA, assign a respective threshold FD DL transmission rate, as the threshold rate, to each STA in the BSS for UL transmissions from the STA to the AP; and
  while the processor is decoding the UL data from the UL STA, select the FD DL STA as the first STA in the queue having a FD DL transmission rate greater than the respective threshold rate assigned to the UL STA.

9. The apparatus of claim 8, wherein the threshold FD DL transmission rate is a single rate assigned to all STAs in the BSS.

10. The apparatus of claim 8, wherein the threshold FD DL transmission rate is different for each STA in the BSS.

11. The apparatus of claim 1, wherein processor is configured to access the queue as a part of a round-robin scheduling algorithm.

12. A method for scheduling full-duplex (FD) downlink (DL) transmissions from an access point (AP) to a plurality of stations (STAs) of a wireless basic service set (BSS), the method comprising:
  decoding, by a processor of the AP, uplink (UL) data received from a UL STA in the BSS;
  selecting, by the processor, a downlink (DL) STA of the plurality of STAs in the BSS from a queue of DL STAs, wherein, the selected DL STA is a first STA in the queue for which a FD DL transmission rate from the AP to the selected STA is greater than a threshold transmission rate while the AP is decoding the UL data from the UL STA;
  providing, by the processor, an amount of data to be transmitted as an FD transmission to the selected DL STA while the AP is decoding the data from the UL STA;
  providing, by the processor, a further amount of data to be transmitted to the DL STA as a half-duplex (HD) transmission; and
  increasing, by the processor, a value representing the amount to be transmitted to the DL STA by the further amount of data.

13. The method of claim 12, further comprising:
  decoding respective first and second acknowledgement messages (ACKs) for the amount of data and the further amount of data; the respective ACKs indicating successful transmission of the amount of data and the further amount of data to the DL STA;
  maintaining a position of the DL STA in the queue responsive to decoding the first ACK; and
  moving, by the processor, the DL STA to a last position in the queue, responsive to decoding the second ACK.

14. The method of claim 12, wherein the BSS includes an integer, M, STAs and the method further comprises:
  identifying N STAs among the M STAs in the BSS, where N is an integer less than M, and where each of the identified N STAs has a FD DL transmission, while the processor is decoding data from the UL STA, that is greater than the threshold transmission rate;
  selecting, by the processor, as the DL STA, one STA of the N identified STAs which one identified STA is highest in the queue among the N identified STAs.

15. The method of claim 12, wherein the BSS includes an integer, M, STAs and the method further comprises:
  calculating, by the processor, for each STA in the BSS, a ratio of a) the FD DL transmission rate for the STA while the processor is decoding data from the UL STA to b) a half-duplex (HD) transmission rate for the STA while the processor is not decoding UL data from any STA in the BSS; and
  selecting, by the processor, the FD DL STA from the queue as a first STA in the queue among an integer, N, STAs, where N is less than M, the N STAs having ratios that are greater than the ratios of the M-N other STAs in the BSS and where the FD DL transmission rate for the selected FD DL STA, while the processor is decoding data from the UL STA, is greater than the threshold transmission rate.

16. The method of claim 12, further comprising:
  prior to decoding the UL data from the UL STA, assigning, by the processor, a respective threshold FD DL data rate, as the threshold transmission rate, to each STA in the BSS for UL transmissions from the STA to the AP; and
  while the processor is decoding the UL data from the UL STA, selecting the FD DL STA as the first STA in the queue having a FD DL data rate greater than the respective threshold transmission rate assigned to the UL STA.

17. The method of claim 12, further comprising accessing the queue, by the processor, as a part of a round-robin scheduling algorithm.

18. A non-transitory computer readable medium including program instructions that, when executed, are configured to cause a processor in an access point (AP) of a basic service set (BSS) to:
  decode uplink (UL) data received via the interface from a UL STA in the BSS;
  select a downlink (DL) STA from a plurality of STAs in the BSS from a queue of DL STAs, wherein, the selected DL STA is a first STA in the queue for which a FD DL transmission rate from the AP to the selected STA is greater than a threshold transmission rate while the AP is decoding the UL data from the UL STA;
  provide an amount of data to be transmitted as an FD transmission to the selected DL STA while the AP is decoding the data from the UL STA;

decode an acknowledgement message (ACK) from the DL STA indicating successful transmission of the amount of data from the AP to the DL STA; and maintain a position of the DL STA in the queue while the amount of data successfully transmitted to the DL STA is less than a threshold amount of data.

19. The non-transitory computer readable medium of claim 18, wherein the program instructions are further configured to cause the processor to:

provide a further amount of data to be transmitted to the DL STA as a half-duplex (HD) transmission;

decode a further ACK from the DL STA indicating successful transmission of the further amount of data; and responsive to decoding the further ACK, move the DL STA to a last position in the queue.

20. The non-transitory computer readable medium of claim 18, wherein the BSS includes an integer, M, STAs and the program instructions are further configured to cause the processor to:

identify N STAs among the M STAs in the BSS, where N is an integer less than M, and where each of the identified N STAs has a FD DL transmission, while the processor is decoding data from the UL STA, that is greater than the threshold transmission rate; and select, as the DL STA, one STA of the N identified STAs, which one identified STA is highest in the queue among the N identified STAs.

21. The non-transitory computer readable medium of claim 18, wherein the BSS includes an integer, M, STAs and the program instructions are further configured to cause the processor to:

calculate for each STA in the BSS, a ratio of a) the FD DL transmission rate for the STA while the processor is decoding data from the UL STA to b) a half-duplex (HD) transmission rate for the STA while the processor is not decoding UL data from any STA in the BSS; and select the FD DL STA from the queue as a first STA in the queue among an integer, N, STAs, where N is less than M, the N STAs having ratios that are greater than the ratios of the M-N other STAs in the BSS and where the FD DL transmission rate for the selected FD DL STA, while the processor is decoding data from the UL STA, is greater than the threshold transmission rate.

22. The non-transitory computer readable medium of claim 18, wherein the program instructions are further configured to cause the processor to:

prior to decoding the UL data from the UL STA, assign a respective threshold FD DL data rate, as the threshold transmission rate, to each STA in the BSS for UL transmissions from the STA to the AP; and while the processor is decoding the UL data from the UL STA, select the FD DL STA as the first STA in the queue having a FD DL data rate greater than the respective threshold assigned to the UL STA.

\* \* \* \* \*

UNITED STATES PATENT AND TRADEMARK OFFICE
CERTIFICATE OF CORRECTION

PATENT NO. : 10,257,108 B2
APPLICATION NO. : 15/471410
DATED : April 9, 2019
INVENTOR(S) : Wang et al.

Page 1 of 1

It is certified that error appears in the above-identified patent and that said Letters Patent is hereby corrected as shown below:

On the Title Page

Page 2, Column 1, item [56], Line 12, delete "Opion" and insert --Opinion-- therefor In the Claims Column 21, Line 16, Claim 7, delete "Lit" and insert --UL-- therefor Column 21, Line 18, Claim 7, delete "LL" and insert --UL-- therefor Column 22, Line 4, Claim 13, delete "data;" and insert --data,-- therefor Signed and Sealed this
Twenty-first Day of April, 2020

Andrei Iancu
*Director of the United States Patent and Trademark Office*